(12) United States Patent
Dickinson

(10) Patent No.: US 7,500,318 B2
(45) Date of Patent: Mar. 10, 2009

(54) THREADED ATTACHMENT POSITION ADAPTER

(75) Inventor: Brian R. Dickinson, Grass Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 83 days.

(21) Appl. No.: 11/608,311

(22) Filed: Dec. 8, 2006

(65) Prior Publication Data

US 2008/0134528 A1 Jun. 12, 2008

(51) Int. Cl.
*G01C 15/02* (2006.01)
(52) U.S. Cl. .......................... 33/293; 359/515
(58) Field of Classification Search .............. 33/286, 33/293, 299, 203.18, 288, 295, 373, 608; 359/515, 546; 356/139.09, 155, 620
See application file for complete search history.

(56) References Cited

U.S. PATENT DOCUMENTS

| | | | |
|---|---|---|---|
| 1,277,932 A * | 9/1918 | Hollifield | 434/19 |
| 3,188,739 A | 6/1965 | Olsen et al. | |
| 4,176,463 A * | 12/1979 | Ringle | 33/203.18 |
| 4,509,269 A | 4/1985 | Leitz | |
| 4,549,360 A | 10/1985 | Allen | |
| 4,926,563 A | 5/1990 | Smith | |
| 4,964,218 A | 10/1990 | Morghen | |
| 5,031,328 A | 7/1991 | Bhaumik | |
| 5,073,005 A | 12/1991 | Hubbs | |
| 5,301,435 A * | 4/1994 | Buckley | 33/293 |
| 5,696,673 A * | 12/1997 | Pryor | 700/66 |
| 5,886,782 A * | 3/1999 | Hedgecock, Jr. | 356/155 |
| 6,048,068 A * | 4/2000 | Broten | 359/524 |
| 6,148,528 A * | 11/2000 | Jackson | 33/288 |
| 6,163,946 A * | 12/2000 | Pryor | 29/407.04 |
| 6,324,767 B1 * | 12/2001 | Houston | 33/365 |
| 6,892,160 B2 | 5/2005 | Gooch et al. | |
| 7,216,436 B2 * | 5/2007 | Whitworth et al. | 33/286 |
| 2007/0242280 A1 * | 10/2007 | Dickinson | 356/620 |
| 2008/0134528 A1 * | 6/2008 | Dickinson | 33/293 |
| 2008/0192371 A1 * | 8/2008 | Hubbs | 359/883 |

FOREIGN PATENT DOCUMENTS

| | | | |
|---|---|---|---|
| FR | 2723214 A1 * | 2/1996 | |
| JP | 60171412 A * | 9/1985 | |
| JP | 08086654 A * | 4/1996 | |
| JP | 09311023 A * | 12/1997 | |
| RU | 2202101 C2 * | 1/2003 | |

* cited by examiner

*Primary Examiner*—R. A. Smith
(74) *Attorney, Agent, or Firm*—Gifford, Krass, Sprinkle, Anderson & Citkowski, P.C.

(57) ABSTRACT

The present invention affords a threaded attachment position adapter used for aiding in the accurate location measurement of items such as holes and studs within or on components, frames, tooling, etc. The adapter is comprised of an elongate rigid rod, an elongate rigid sleeve, which the rod slides into and is held, and a target arm with a contrast or reflective target set thereon that is fixedly attached to the sleeve. The rigid sleeve and target arm fixedly attached thereto can be held at or moved to a desired location as the rigid rod is screwed into a threaded hole or onto a threaded stud whose location is desired. The target arm is fixedly attached to the sleeve. The contrast or reflective targets can be easily and efficiently located at a fixed and known distance from an item to measured and thus aid in determining the items accurate location.

21 Claims, 5 Drawing Sheets

THREADED ATTACHMENT POSITION ADAPTER

FIELD OF THE INVENTION

The present invention relates in general to measuring physical positions using photogrammetry techniques and in particular to measuring the coordinate positions of threaded fasteners using photogrammetry techniques.

BACKGROUND OF THE INVENTION

An important activity in industrial manufacturing processes is the taking of precise measurements of patterns, machine components, workpieces, locations of holes and/or studs and the like. In particular, when individual components are manufactured at different locations and assembled together at a final assembly shop, proper alignment of said components is critical. Accuracy in fitting these components together makes it possible to avoid reworking and modifications. Furthermore, when individual components do not properly align, identification of the root cause of the misalignment is important for the analysis and correction of the problem.

Providing holes, studs and abutment surfaces in proper, precise locations on tooling, machine components, automobile frames, and the like is normally accomplished using a reference system such as a tool and ball system or a line of sight system. In each of these reference systems, a sighting target is positioned on special tooling and instruments are used to determine proper, precise locations of holes, studs and/or abutment surfaces with respect to such targets.

Using conventional coordinate measuring machines a hole position, threaded or otherwise, is typically described by selecting three points on the surface adjacent to the hole which is used to create a plane, and the hole axis vector. Three points are then selected in the hole to create the hole axis. The intersection of the hole axis along the vector at the plane then describes the center point of the hole on the surface. This method is subject to operator error and obstruction issues. At times a gauge is inserted into the hole and this provides an easier means of picking or selecting points on a cylinder parallel to the hole axis.

With surface scanning equipment, the inner surface of a hole or the outer surface of a stud can be scanned. From the scanned data, a surface and cylinder can be constructed and the intersection of the surface and the constructed cylinder axis can be used to determine a measurement point. This method is tedious but can yield accurate positional measurements. Furthermore, this method cannot be used on any fastener without a direct line of sight.

Using photogrammetry a similar procedure is undertaken where three points are selected on the surface near the hole in question to produce a plane and the hole edge is determined via contrast in measurement images. This method becomes less accurate as the contrast between the edge and the background data is reduced. Accuracy is also reduced as the angle of incidence for the measurement image increases, becoming essentially useless as the angle approaches 40 degrees. Furthermore, this method cannot determine the position of holes which are obstructed by other features of the object being measured. In many cases a target can be inserted into the hole thus allowing a direct measurement, however accuracy is again degraded as the angle of incidence increases and is useless if the hole is obstructed. Advanced computer-aided systems are typically utilized in the above referred to reference systems.

In the advancement of the above described measurement systems, advanced computer-aided photogrammetry has been utilized as a measurement tool for determining specific locations on industrial devices and equipment. Light-reflective or contrasting targets are positioned at predetermined locations on specialized tooling in accordance with a prearranged pattern, thus allowing the precise relationship of the pre-selected locations to be measured and/or verified. However, placing contrast or reflective targets at the pre-selected locations can be a burdensome and time-consuming task. For example, if a contrast target is affixed to a flange that is welded to a bolt used to screw into a threaded hole, tightening of the bolt to secure the contrast target to the hole forces the contrast target to rotate as the bolt is tightened, and could position the contrast target in an undesirable location or interfere with obstructions while being rotated to engage the threads. Therefore, there is a need for specialized tooling that will allow a user to secure a contrast or reflective target relative to a desired location and yet provide freedom of movement such that the target location can be positioned as desired.

SUMMARY OF THE INVENTION

The present invention affords a threaded attachment position adapter used for aiding in the accurate location measurement of items such as holes and studs within or on components, frames, tooling, etc. The adapter is comprised of an elongate rigid rod, an elongate rigid sleeve, which the rod slides into and is held, and a target member with a contrast or reflective target set thereon that is fixedly attached to the sleeve. The rigid rod has a thread end fitted with either male or female threads. When the rigid rod is axially located within the rigid sleeve, the rigid sleeve and target member fixedly attached thereto can be held at or moved to a desired location as the rigid rod is screwed into a threaded hole or onto a threaded stud whose location is desired. Furthermore, the target member is fixedly attached to the sleeve in such a manner to afford for the target set to be approximately normal or approximately parallel to the axis of the rod. In this manner, the contrast or reflective targets can be easily and efficiently located at a fixed and known distance from an item to measured, regardless of the rotational net out position of the threaded fastener, and thus aid in determining the items accurate location.

DETAILED DESCRIPTION OF THE INVENTION

Figure 1:
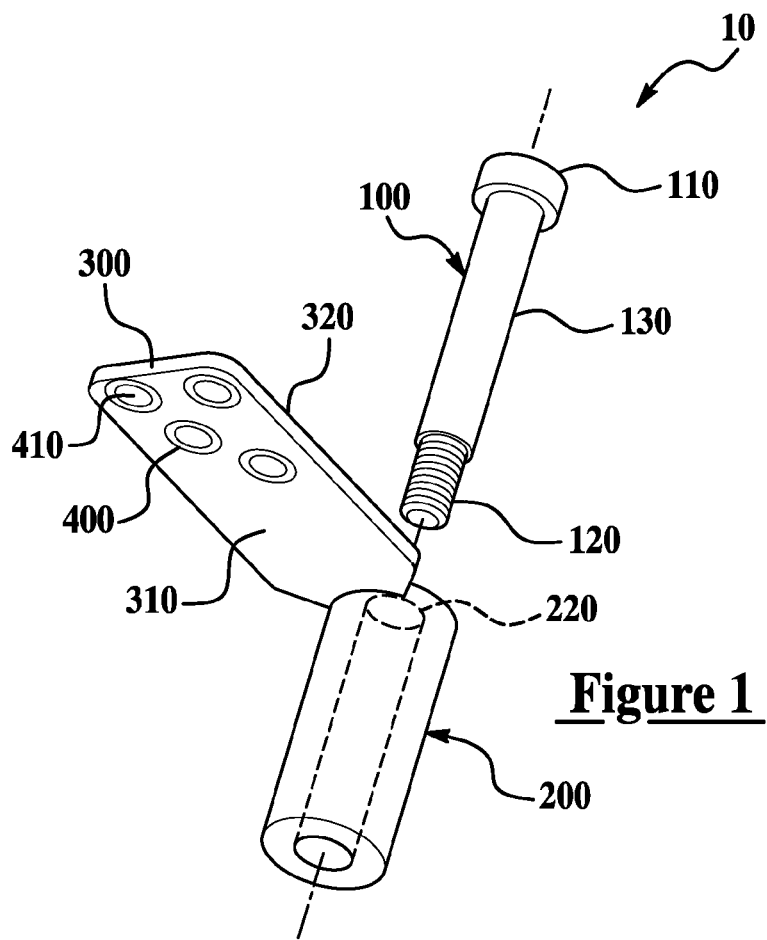
FIG. 1 is a first embodiment of the present invention wherein the adapter aids in the location measurement of a threaded hole in a component surface facing away from an imaging device.

A threaded attachment position adapter according to a first embodiment of the present invention is shown generally in FIG. 1 at 10. In this embodiment, the adapter 10 is used to measure the location of a threaded hole in a surface facing away from an imaging device. For the purposes of the present invention and for illustrative purposes only, an imaging device is defined as any equipment that can capture and store images, for example a digital or video camera.

The threaded hole can be part of any component or article, for example a pattern, machine component, tooling, a jig or fixture, aircraft or automobile structure, as well as combinations thereof. The threaded attachment position adapter 10 shown in FIG. 1 has an elongate rigid rod 100. The elongate rigid rod 100 has a head 110, a thread end 120, and an outer diameter 130. Any type of threaded elongate rigid rod can be used in the present invention, illustratively including a threaded bolt, a shoulder bolt or a precision shoulder bolt. The head 110 of elongate rigid rod 100 utilizes any type of a tightening and loosening means (not shown) to aid in the screwing and unscrewing of rod 100 into a desired hole, illustratively including an hex head socket, screw driver receiving slot or facets for use with a wrench. The thread end 120 as shown in the present embodiment is a male thread end. The rod 100 can be constructed from any suitable material known to those skilled in the art, illustratively including metals, alloys, ceramics and plastics.

In addition to the elongate rigid rod 100, an elongate rigid sleeve 200 with a target member 300 fixedly attached thereon is shown. The elongate rigid sleeve 200, also known as an adapter body, has an inner diameter 220. The inner diameter 220 is of a dimension that affords for the axial placement of elongate rigid rod 100 within elongate rigid sleeve 200. The target member 300 is comprised of a plate or arm extending outwardly from sleeve 200 and has a target surface 310 and a non-target surface 320. The target surface 310 has a contrast or reflective target set 400 located thereon. Preferably the target set 400 is comprised of at least three individual targets 410. Less preferably, the target set 400 is comprised of less than three targets 410. This embodiment affords for member 300 with target set 400 thereon to be generally normal to rod 100. Contrast or reflective targets 410 are commercially available and commonly purchased by those skilled in the art. One suitable embodiment of a contrast target is comprised of a circular target with a white center "reflector" surrounded by a black background. Similar to the elongate rigid rod 100, elongate rigid sleeve 200 and target member 300 are constructed from any suitable material known to those skilled in the art, illustratively including metals, alloys, ceramics and plastics.

Figure 2:
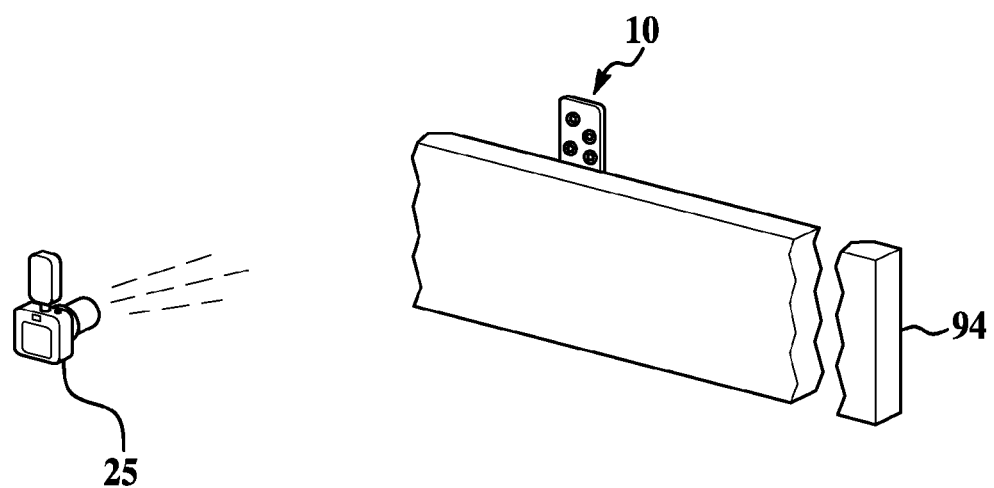
FIG. 2 is a perspective view of the first embodiment of the present invention wherein the adapter is aiding in the location measurement of a hole that is in a component surface facing away from an imaging device.

Insertion of the elongate rigid rod 100 into the elongate rigid sleeve 200 affords for a 360 degree rotational movement of the target member 300 about rod 100. In the alternative, insertion of the elongate rigid rod 100 into the elongate rigid sleeve 200 affords for a 360 degree rotational movement of rod 100 while sleeve 200 remains stationary. As elongate rigid rod 100 with thread end 120 is screwed into a threaded hole to be measured (not shown), the elongate rigid sleeve 200 with target member 300 is held at or moved to a desired location until force exhibited by the head 110 onto sleeve 200—resulting from the tightening of rod 100 into the hole—fixedly positions said target member 300 in a desired position. In this manner, FIG. 2 illustrates how target member 300 with contrast or reflective target set 400 thereon is positioned such that adapter 10 affords for the location measurement of a threaded hole within a component surface 94 that is facing away from imaging device 25.

Figure 3:
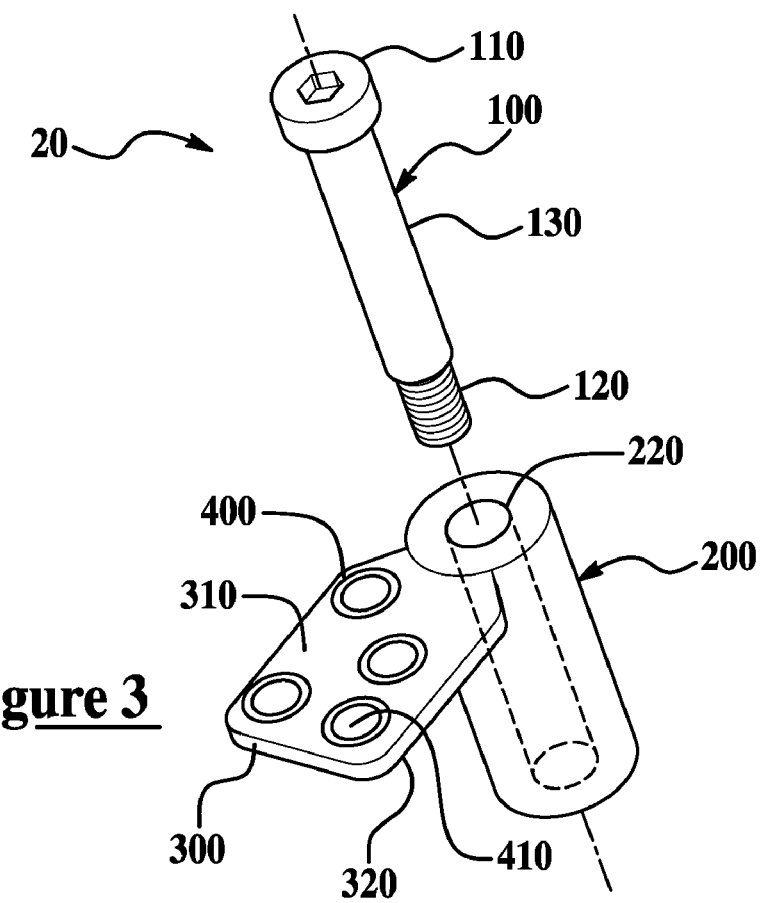
FIG. 3 is a perspective view of a second embodiment of the present invention wherein the adapter aids in the location measurement of a threaded hole in a component surface facing an imaging device.
Figure 4:
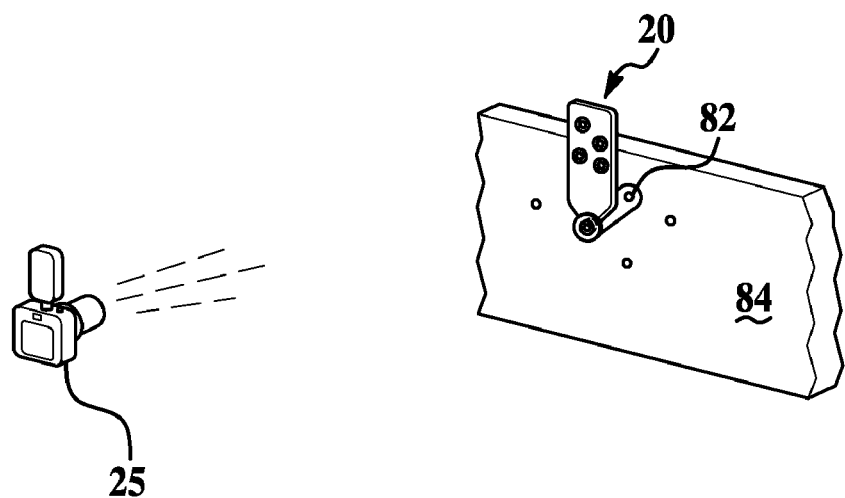
FIG. 4 is a perspective view of the second embodiment of the present invention wherein the adapter is aiding in the location measurement of a threaded hole in a component surface facing an imaging device.
Figure 5:
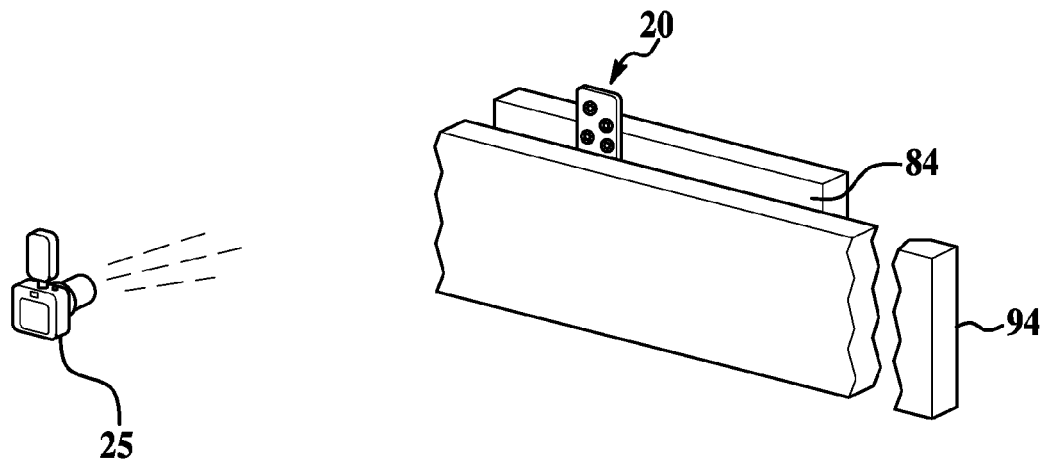
FIG. 5 is a perspective view of the second embodiment of the present invention wherein the adapter is aiding in the location measurement of a threaded hole in a component surface facing an imaging device but the surface is obscured by a different component.

A second embodiment of the present invention is shown generally at 20 in FIG. 3. In this embodiment the elongate rigid rod 100 and elongate rigid sleeve 200 are identical to the first embodiment described above. However, the second embodiment of the present invention is used to measure the location of a threaded hole (not shown) within a component surface that is facing an imaging device. Therefore, the target surface 310 with contrast or reflective target set 400 attached thereupon is located opposite the target surface 310 of the first embodiment shown in FIG. 1. The operation and freedom of movement of the target member 300 and rod 100 is the same as in the first embodiment above. FIG. 4 illustrates the use of adapter 20 in measuring the location of hole 82 when said hole is located within surface 84 which faces imaging equipment 25. In addition, FIG. 5 illustrates the use of adapter 20 when the view of surface 84, and thus hole 82, is obscured by a different component, for example component 90.

Figure 6:
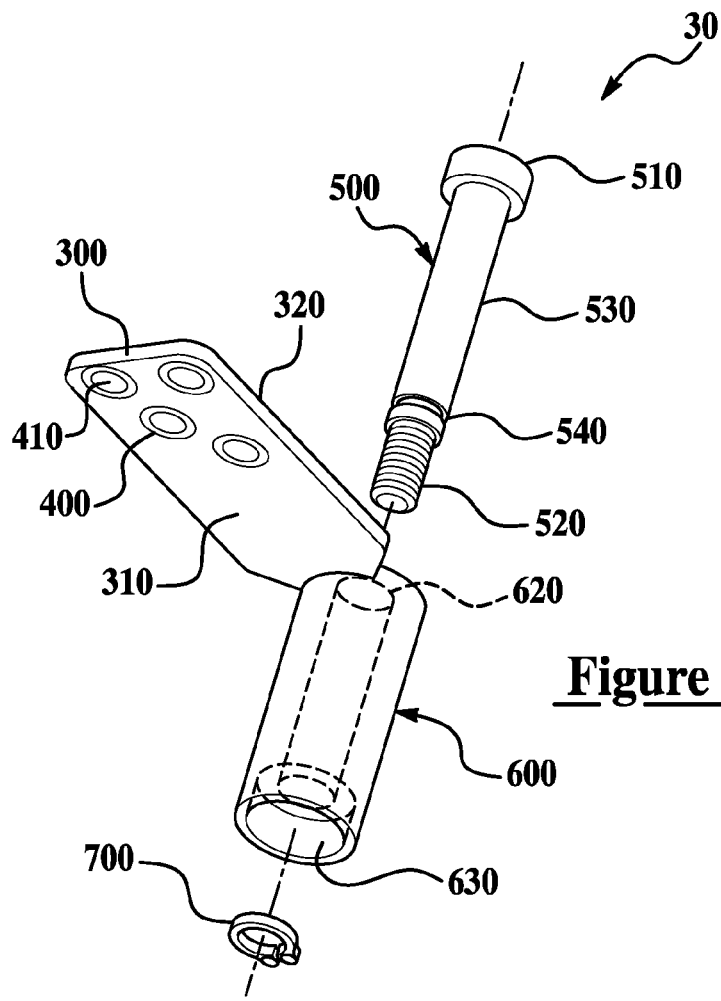
FIG. 6 is a perspective view of a third embodiment of the present invention wherein the adapter aids in the location measurement of a threaded hole in a component surface facing away from an imaging device.

Referring now to FIG. 6, a third embodiment of the present invention is shown generally at 30. In this embodiment an elongate rigid rod 500 has a head 510, a thread end 520, an outer diameter 530 and a radial groove 540. The radial groove 540 affords for a radial clamp 700 to be placed therein after rod 500 is axially inserted within sleeve 600. The type of radial clamp 700 shown in FIG. 6 is known by those skilled in the art as a snap ring. In the alternative, any type of radial clamp that securely fits within radial groove 540 can be used.

To complement the use of radial clamp 700 placed within radial groove 540, elongate rigid sleeve 600 has recessed volume 630 therein. Radial clamp 700 can fit within recessed volume 630. With the placement of elongate rigid rod 500 within elongate rigid sleeve 600 and subsequent attachment of radial clamp 700 within radial groove 540, elongate rigid rod 500 and elongate rigid sleeve 600 are bound together and yet allow for 360 degree rotation of elongate rigid rod 500. In this manner, the elongate rigid rod 500 can be screwed into a threaded hole whose location measurement is desired while allowing the sleeve 600, and more importantly member 300 with target set 400 thereon, to be held at a desired location.

As shown in FIG. 6, elongate rigid sleeve 600 has target member 300 with target surface 310 and non-target surface 320. Again, target surface 310 is identified by the placement of target set 400 thereon. In this manner, the third embodiment of the present invention is used to measure a threaded hole in a component surface facing away from an imaging device.

Figure 7:
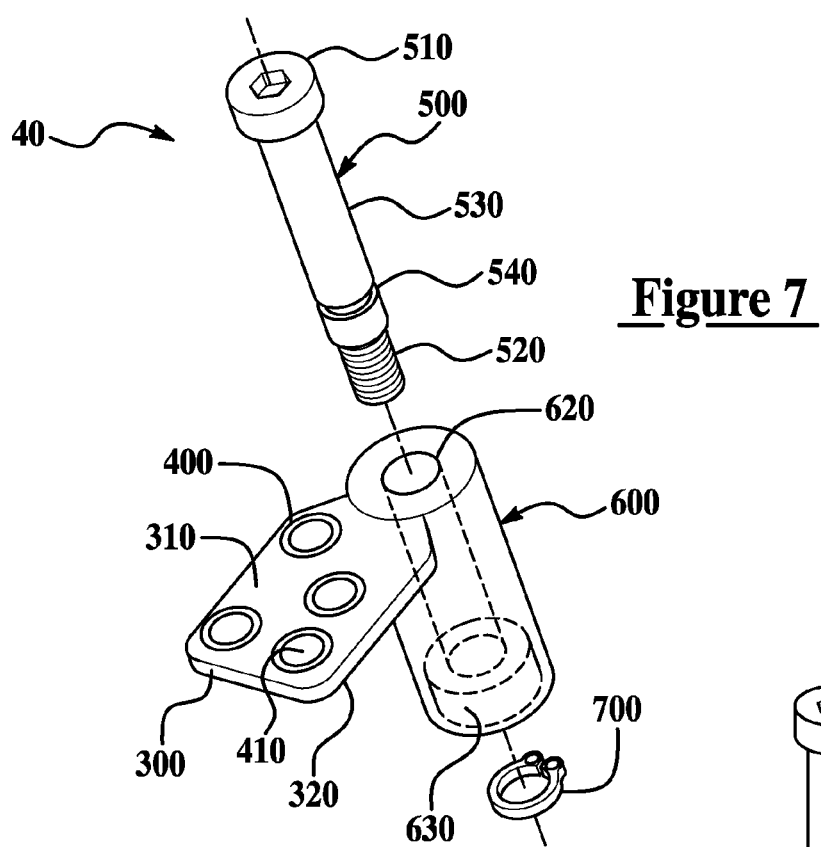
FIG. 7 is a perspective view of a fourth embodiment of the present invention wherein the adapter aids in the location measurement of a threaded hole in a component surface facing an imaging device.

A fourth embodiment of the present invention is shown generally at 40 in FIG. 7. This embodiment is similar to the third embodiment shown in FIG. 6 except that adapter 40 is used to measure a threaded hole (not shown) in a component surface facing an imaging device. Therefore, the elongate rigid sleeve 600 has a target surface 310 facing the opposite direction as the embodiment shown in FIG. 6.

Figure 8:
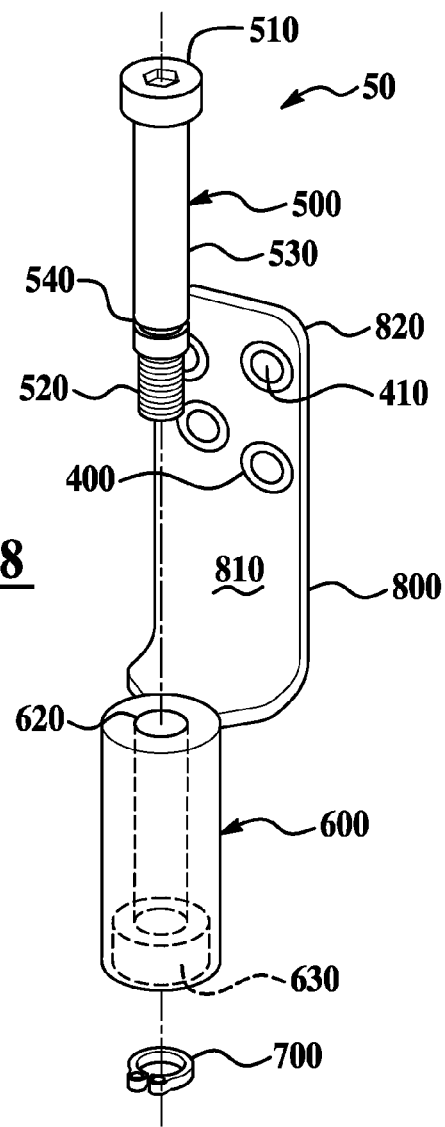
FIG. 8 is a perspective view of a fifth embodiment of the present invention wherein the adapter aids in the location measurement of a threaded hole in a component surface parallel to an imaging device.

Referring to FIG. 8, a fifth embodiment of the present invention is shown generally at 50. This embodiment shows an adapter used to measure a threaded hole in a component surface that is parallel to an imaging device. The elongate rigid rod 500 and elongate rigid sleeve 600 are identical to the embodiments shown in FIGS. 6 and 7, however a target member 800 with target surface 810 and non-target surface 820, is fixedly attached to elongate rigid sleeve 600 such that target set 400 is aligned parallel to the hole axis being measured. In the alternative, target member 800 can be fixedly attached to elongate rigid sleeve 600 such that the contrast or reflective target set 400 is not parallel to the axis of the hole being measured. Furthermore, if desired, the target set 400 can be located on the opposite side of target member 800 such that it faces away from the hole axis. This embodiment affords for target member 800 with target set 400 thereon to be approximately parallel to rod 500.

Figure 9:
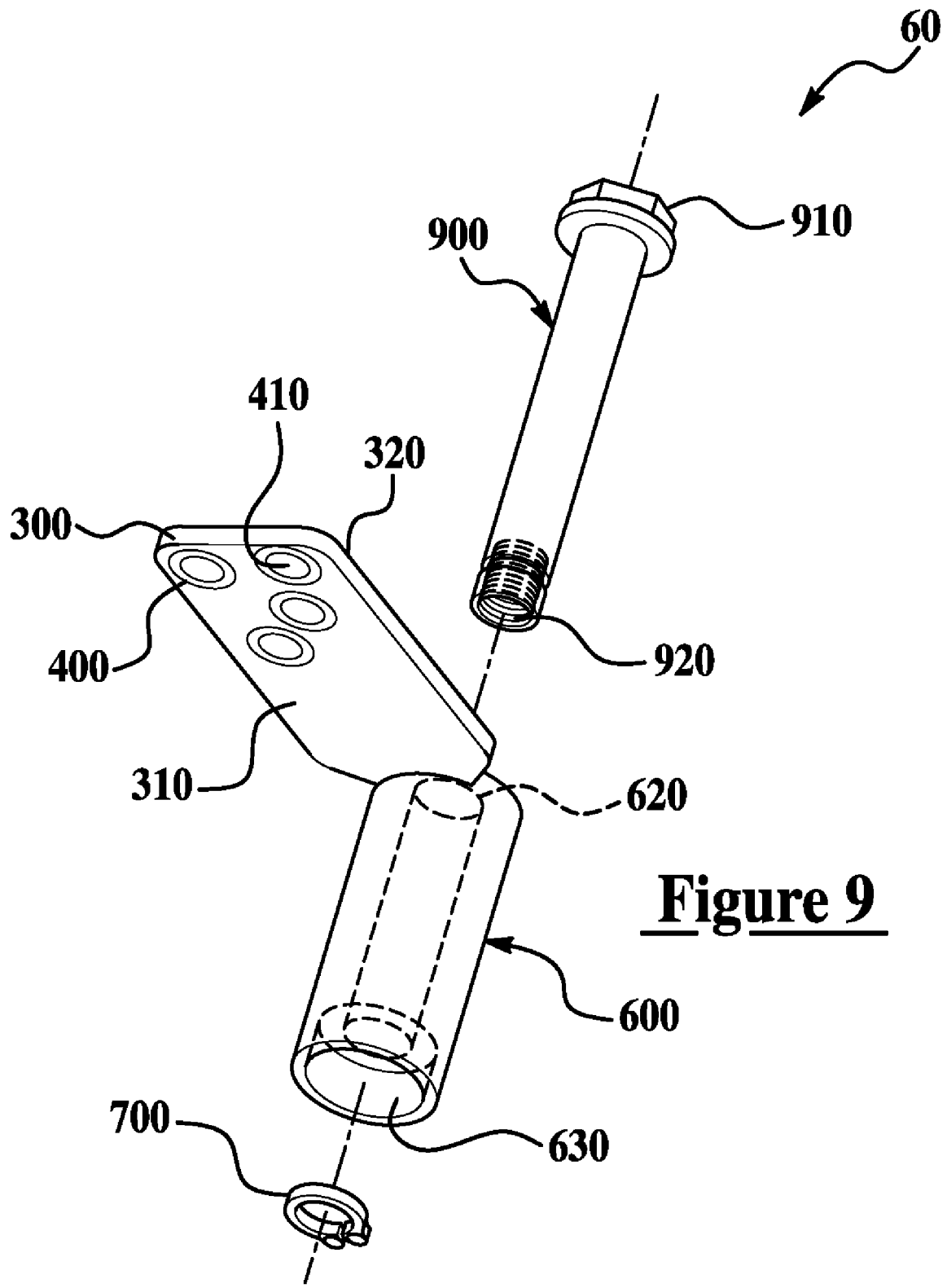
FIG. 9 is a perspective view of a sixth embodiment of the present invention wherein the adapter aids in the location measurement of a threaded stud on a component surface facing away from an imaging device.

FIG. 9 illustrates a sixth embodiment of the present invention at reference numeral 60. In this embodiment, the elongate rigid rod 900 has a female thread end 920. In addition, head 910 is faceted such that a socket or wrench can be used to tighten or loosen rod 900. In this manner, a threaded attachment position adapter is used to measure the location of a threaded stud (not shown). The elongate rigid rod 900 with female thread end 920 can be used with all of the embodiments regarding target members and targets shown and described above.

The foregoing description is illustrative of particular embodiments of the invention, but is not meant to be a limitation upon the practice thereof. The following claims, including all equivalents thereof, are intended to define the scope of the invention.

The invention claimed is:

1. A threaded attachment position adapter to aid in the location measurement of a threaded hole or threaded stud in or on a component, said position adapter comprising:
    an elongate rigid rod having a thread end;
    an elongate rigid sleeve having an inner diameter, the inner diameter defining an aperture, the aperture affording said rod to be axially located within said sleeve;
    an arm extending along a plane which extends radially outwardly from a central axis of said sleeve, said arm having a target set thereon, for providing a threaded attachment position adapter with said arm rotatable 360 degrees around said rod.

2. The invention of claim 1 wherein the thread end of said rod is a male thread end.

3. The invention of claim 1 wherein the thread end of said rod is a female thread end.

4. The invention of claim 1 wherein said rod is a precision shoulder bolt.

5. The invention of claim 1 wherein said arm with said target set located thereon is fixedly attached to said sleeve, for providing said target set generally normal to said rod.

6. The invention of claim 1 wherein said arm with said target set located thereon is fixedly attached to said sleeve, for providing said target set generally parallel to said rod.

7. The invention of claim 1 wherein said target set of said arm has at least two targets thereon.

8. The invention of claim 1 wherein said target set of said arm has at least three targets thereon.

9. The invention of claim 1 wherein said target set is a contrast target set comprised of contrast targets.

10. The invention of claim 1 wherein said target set is a reflective target set comprised of reflective targets.

11. A threaded attachment position adapter to aid in the location measurement of a threaded hole or threaded stud in or on a component, said position adapter comprising:
    an elongate rigid rod having a thread end and a radial groove;
    an elongate rigid sleeve having an inner diameter, the inner diameter defining an aperture, the aperture affording said rod to be axially located within said sleeve;
    a target arm fixedly extending outwardly from said sleeve, said member having a target set thereon; and
    a radial clamp, said clamp being of dimension to afford location of said clamp within said groove, for providing a threaded attachment position adapter with said target member rotatable 360 degrees around said rod.

12. The invention of claim 11 wherein the thread end of said rod is a male thread end.

13. The invention of claim 11 wherein the thread end of said rod is a female thread end.

14. The invention of claim 11 wherein said radial clamp is a snap ring.

15. The invention of claim 11 wherein said rod is a precision shoulder bolt.

16. The invention of claim 11 wherein said arm with said target set located thereon is fixedly attached to said sleeve, for providing said target set generally normal to said rod.

17. The invention of claim 11 wherein said target set of said member with said target set located thereon is fixedly attached to said sleeve, for providing said target set generally parallel to said rod.

18. The invention of claim 11 wherein said target set of said member has at least two targets thereon.

19. The invention of claim 11 wherein said target set of said member has at least three targets thereon.

20. The invention of claim 11 wherein said target set is a contrast target set comprised of contrast targets.

21. The invention of claim 11 wherein said target set is a reflective target set comprised of reflective targets.

* * * * *